UNITED STATES PATENT OFFICE.

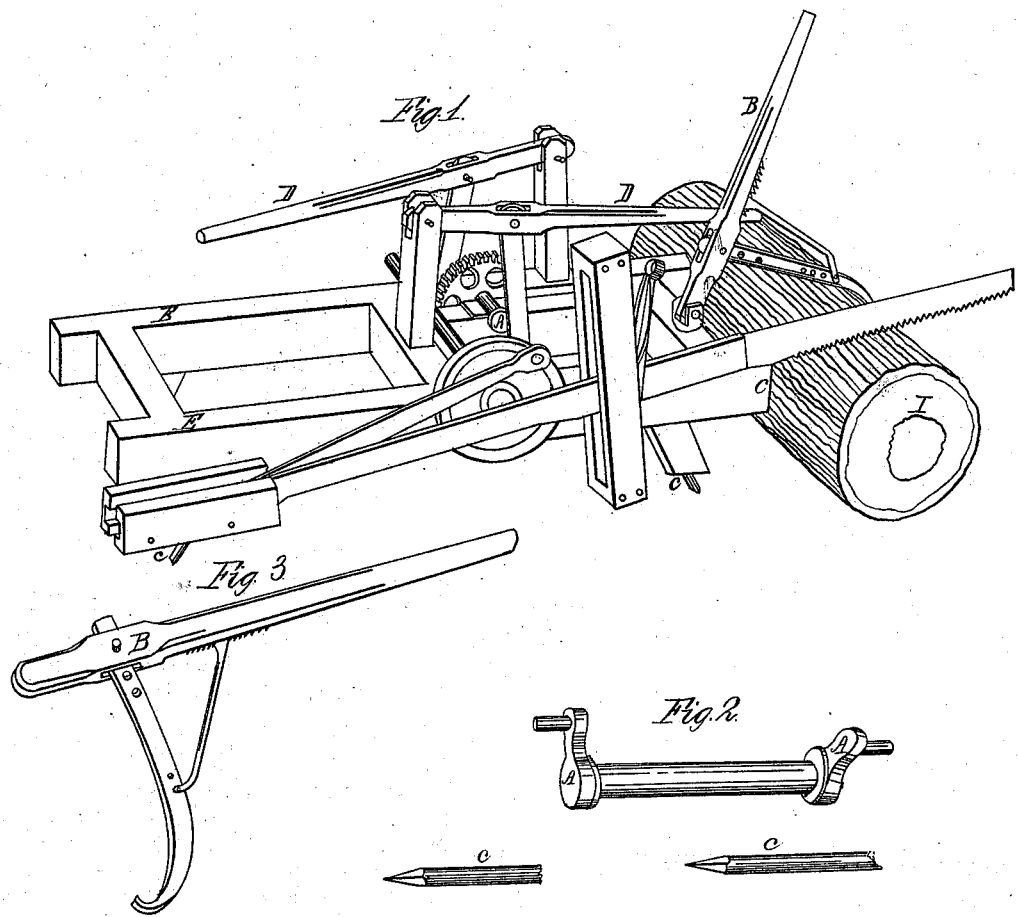

DANIEL SNELL, OF SPRINGFIELD, OHIO, ASSIGNOR TO HIMSELF AND J. H. GANO, OF SAME PLACE.

IMPROVEMENT IN WOOD-SAWING MACHINES.

Specification forming part of Letters Patent No. 83,416, dated October 27, 1868; antedated May 28, 1868.

*To all whom it may concern:*

Be it known that I, DANIEL SNELL, of Springfield, in the county of Clark, in the State of Ohio, have invented a new and useful Improvement in Wood-Sawing Machines; and I do declare that the following is a full, clear, and exact description of the construction and operation of the same, reference being had to the accompanying drawings, making a part of this specification, in which—

Figure I is a wood-sawing machine, in perspective view, to which my improvements are attached. Fig. III is an ordinary cant-hook, which is attached to the forward cross-beam of the machine by a stem-clevis to its fulcrum end.

C C are spurs or spikes projecting from the bed-timbers at their forward ends. The bed-timbers are marked E E. The spurs or spikes C C are also used in the feet of the machine to keep it firm upon the ground.

Similar letters of reference indicate corresponding parts.

The object of this invention is to retain securely in position against the log which is being cut by it a portable wood-sawing machine, or one in which the machine is moved along the body of the tree, to saw it into sections, instead of using a logway, truck, or drag to transport the logs to the sawing-machine, and embraces the points, spurs, or spikes C C and the grab or cant hook B, fastened by its fulcrum end to the forward cross-beam of the machine.

To enable others skilled in the art to understand my invention, I will proceed to describe its operation.

In setting the wood-sawing machine for working, the weight of the same is brought up against the log, so as to pierce it with the projecting spikes C C at the forward ends of the bed-timbers. The cant-hook B is then thrown over the log and braced securely, and the machine and log are thus fixed in position, so as to permit the saw to work freely without danger of moving the log or machine.

In small timber the advantage of using my invention is readily observed; also in sawing up the lap-wood or tops of large trees.

What I claim as new in my invention, and desire to secure by Letters Patent, is—

The combination of the spikes or spur-points C C in the forward ends of the bed-timbers, to pierce the log to be sawed, and the grab or cant hook B in addition thereto, hinged or fastened to the forward cross-beam, the whole constructed substantially as described, as and for the purpose specified.

DANIEL SNELL.

Witnesses:
   G. C. RAWLINS,
   B. C. CONVERSE.